(12) United States Patent
Edwards et al.

(10) Patent No.: US 7,496,787 B2
(45) Date of Patent: Feb. 24, 2009

(54) SYSTEMS AND METHODS FOR CHECKPOINTING

(75) Inventors: John Edwards, Clinton, MA (US); Michael Budwey, Holliston, MA (US)

(73) Assignee: Stratus Technologies Bermuda Ltd., Hamilton (BM)

( * ) Notice: Subject to any disclaimer, the term of this patent is extended or adjusted under 35 U.S.C. 154(b) by 746 days.

(21) Appl. No.: 11/118,869

(22) Filed: Apr. 29, 2005

(65) Prior Publication Data

US 2006/0143528 A1    Jun. 29, 2006

Related U.S. Application Data

(60) Provisional application No. 60/639,358, filed on Dec. 27, 2004.

(51) Int. Cl.
G06F 11/00 (2006.01)
(52) U.S. Cl. .......................................... 714/13; 714/15
(58) Field of Classification Search ...................... None
See application file for complete search history.

(56) References Cited

U.S. PATENT DOCUMENTS

| | | | |
|---|---|---|---|
| 3,736,566 A * | 5/1973 | Anderson et al. ............. | 714/15 |
| 4,831,581 A * | 5/1989 | Rubinfeld .................... | 711/126 |
| 5,099,485 A | 3/1992 | Bruckert et al. | |
| 5,155,809 A | 10/1992 | Baker et al. | |
| 5,157,663 A | 10/1992 | Major et al. | |
| 5,193,162 A | 3/1993 | Bordsen et al. | |
| 5,333,265 A | 7/1994 | Orimo et al. | |
| 5,357,612 A | 10/1994 | Alaiwan | |
| 5,404,361 A | 4/1995 | Casorso et al. | |
| 5,465,328 A | 11/1995 | Dievendorff et al. | |
| 5,568,380 A * | 10/1996 | Brodnax et al. ............... | 700/79 |
| 5,615,403 A | 3/1997 | Bissett et al. | |
| 5,621,885 A | 4/1997 | Del Vigna, Jr. | |
| 5,694,541 A | 12/1997 | Service et al. | |
| 5,721,918 A | 2/1998 | Nilsson et al. | |
| 5,724,581 A | 3/1998 | Kozakura | |
| 5,787,485 A | 7/1998 | Fitzgerald, V et al. | |
| 5,790,397 A | 8/1998 | Bissett et al. | |
| 5,802,265 A | 9/1998 | Bressoud et al. | |
| 5,892,928 A | 4/1999 | Wallach et al. | |
| 5,896,523 A | 4/1999 | Bissett et al. | |
| 5,913,021 A * | 6/1999 | Masubuchi ................... | 714/15 |
| 5,918,229 A | 6/1999 | Davis et al. | |
| 5,923,832 A | 7/1999 | Shirakihara et al. | |
| 5,933,838 A | 8/1999 | Lomet | |
| 5,958,070 A | 9/1999 | Stiffler | |
| 5,968,185 A | 10/1999 | Bressoud et al. | |

(Continued)

FOREIGN PATENT DOCUMENTS

EP        0 974 912 A2        1/2000

(Continued)

*Primary Examiner*—Gabriel L Chu
(74) *Attorney, Agent, or Firm*—K&L Gates LLP

(57) ABSTRACT

The invention relates to checkpointing memory. In one aspect, a processor directs a write request to a location within a first memory. The write request includes at least a data payload and an address identifying the location. An inspection module identifies the write request before it reaches the first memory, copies at least the address identifying the location, and forwards the write request to a memory agent within the first memory.

38 Claims, 2 Drawing Sheets

U.S. PATENT DOCUMENTS

| | | |
|---|---|---|
| 6,067,550 A | 5/2000 | Lomet |
| 6,088,773 A * | 7/2000 | Kano et al. ............... 711/161 |
| 6,098,137 A | 8/2000 | Goodrum et al. |
| 6,141,769 A | 10/2000 | Petivan et al. |
| 6,289,474 B1 | 9/2001 | Beckerle |
| 6,718,538 B1 | 4/2004 | Mathiske |
| 2002/0147890 A1 * | 10/2002 | Saulsbury et al. ........... 711/154 |
| 2003/0163763 A1 * | 8/2003 | DeLano ...................... 714/15 |

FOREIGN PATENT DOCUMENTS

| | | |
|---|---|---|
| GB | 2 268 817 A | 1/1994 |
| WO | WO 92/17842 | 10/1992 |

* cited by examiner

SYSTEMS AND METHODS FOR CHECKPOINTING

CROSS-REFERENCE TO RELATED APPLICATION

This is based on and claims priority to and the benefit of Provisional U.S. Patent Application Ser. No. 60/639,358, filed on Dec. 27, 2004, the entirety of which is hereby incorporated herein by reference.

TECHNICAL FIELD

The present invention relates to checkpointing protocols. More particularly, the invention relates to systems and methods for checkpointing.

BACKGROUND

Most faults encountered in a computing device are transient or intermittent in nature, exhibiting themselves as momentary glitches. However, since transient and intermittent faults can, like permanent faults, corrupt data that is being manipulated at the time of the fault, it is necessary to have on record a recent state of the computing device to which the computing device can be returned following the fault.

Checkpointing is one option for realizing fault tolerance in a computing device. Checkpointing involves periodically recording the state of the computing device, in its entirety, at time intervals designated as checkpoints. If a fault is detected at the computing device, recovery may then be had by diagnosing and circumventing a malfunctioning unit, returning the state of the computing device to the last checkpointed state, and resuming normal operations from that state.

Advantageously, if the state of the computing device is checkpointed several times each second, the computing device may be recovered (or rolled back) to its last checkpointed state in a fashion that is generally transparent to a user. Moreover, if the recovery process is handled properly, all applications can be resumed from their last checkpointed state with no loss of continuity and no contamination of data.

Nevertheless, despite the existence of current checkpointing protocols, improved systems and methods for checkpointing the state of a computing device, and/or its component parts, are still needed.

SUMMARY OF THE INVENTION

The present invention provides systems and methods for checkpointing the state of a computing device, and facilitates the recovery of the computing device to its last checkpointed state following the detection of a fault.

In accordance with one feature of the invention, a computing system includes first and second computing devices, which may each include the same hardware and/or software as the other. One of the computing devices initially acts as a primary computing device by, for example, executing an application program and storing data to disk and/or memory. The other computing device initially acts as a secondary computing device with any application programs for execution thereon remaining idle. Preferably, at each checkpoint, the secondary computing device's disk and memory are updated so that their contents reflect those of the disk and memory of the primary computing device.

Accordingly, upon detection of a fault at the primary computing device, processing may resume at the secondary computing device. Such processing may resume from the then current state of the secondary computing device, which represents the last checkpointed state of the primary computing device. Moreover, the secondary computing device may be used to recover, and/or update the state of, the primary computing device following circumvention of the fault at the primary computing device. As such, the computing system of the invention is fault-tolerant.

In general, in one aspect, the present invention relates to systems and methods for checkpointing memory. A processor may direct a write request to a location within a first memory. The write request may include a data payload and an address identifying the location. An inspection module may identify the write request before it reaches the first memory, copy the address identifying the location, and forward the write request to a memory agent within the first memory. The location within the first memory may be configured to store the data payload, and the memory agent may be configured to buffer the write request and to forward the data payload to the location.

BRIEF DESCRIPTION OF THE DRAWINGS

The foregoing and other objects, aspects, features, and advantages of the invention will become more apparent and may be better understood by referring to the following description taken in conjunction with the accompanying drawings, in which.

DETAILED DESCRIPTION

The present invention relates to checkpointing protocols for fault tolerant computing systems. For example, the present invention relates to systems and methods for checkpointing memory operations. In addition, the present invention also relates to systems and methods for recovering (or rolling back) a memory upon the detection of a fault in the computing system.

One embodiment of the present invention relates to systems and methods for checkpointing memory. In this embodiment, the computing system includes first and second memories. One or more processors may direct write requests to the first memory, which can store data associated with those write requests thereat. The one or more processors may also initiate a checkpoint, at which point the second memory is updated to reflect the contents of the first memory. Once updated, the second memory contains all the data stored in the first memory as it existed just prior to the point in time at which the last checkpoint was initiated. Accordingly, in the event of failure or corruption of the first memory, the second memory may be used to resume processing from the last checkpointed state, and to recover (or roll back) the first memory to that last checkpointed state.

In accordance with this embodiment of the invention, the second memory may be remotely located from the first memory (i.e., the first and second memories may be present on different computing devices that are connected by a communications channel). Alternatively, the second memory may be local to the first memory (i.e., the first and second memories may be present on the same computing device). To checkpoint the state of the first memory, one or more checkpoint controllers and an inspection module may be used.

Preferably, the inspection module is positioned on a memory channel and in series between the one or more processors and the first memory. The inspection module may be configured to identify a write request directed by a processor to a location within the first memory, and to copy an address included within the write request that identifies the location within the first memory to which the write request is directed. Optionally, the inspection module may also copy the data of the write request, and forward the copied address and data to a first checkpoint controller for use in checkpointing the state of the first memory. Alternatively, the inspection module forwards only the copied address to the first checkpoint controller for use in checkpointing the state of the first memory. In this latter case, the first checkpoint controller then retrieves, upon the initiation of a checkpoint, the data stored at the location within the first memory identified by that copied address, and uses such retrieved data in checkpointing the state of the first memory.

Figure 1:
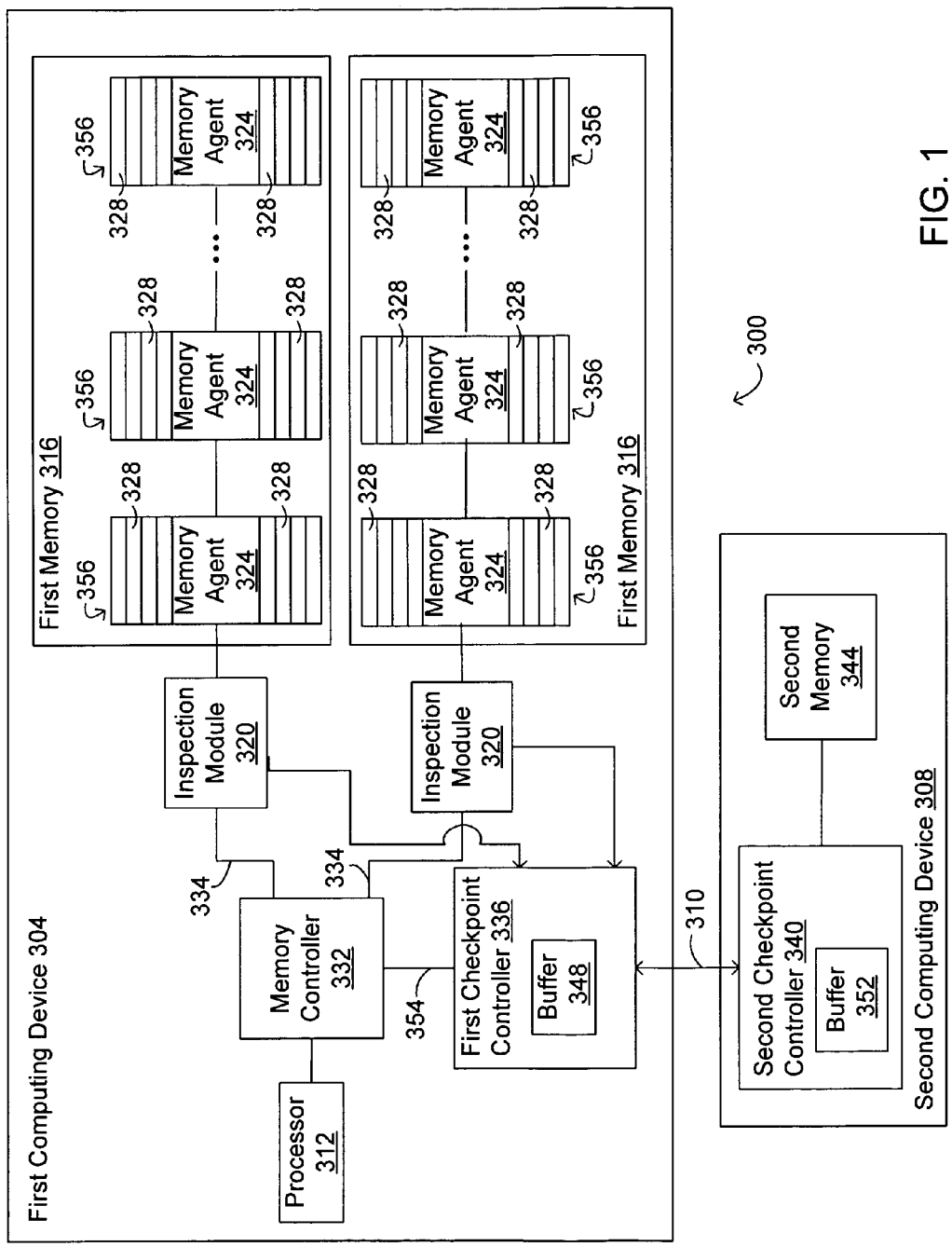
FIG. 1 is a block diagram illustrating a computing system for checkpointing memory according to another embodiment of the invention.

FIG. 1 is a block diagram illustrating a computing system 300 for checkpointing memory according to this embodiment of the invention. The computing system 300 includes a first computing device 304 and, optionally, a second computing device 308 in communication with the first computing device 304 over a communication link 310. The first and second computing devices 304, 308 can each be any workstation, desktop computer, laptop, or other form of computing device that is capable of communication and that has enough processor power and memory capacity to perform the operations described herein. In one embodiment, the first computing device 304 includes at least one processor 312, at least one first memory 316 (e.g., one, two (as illustrated), or more first memories 316), and at least one inspection module 320 (e.g., one, two (as illustrated), or more inspection modules 320). A first memory 316 can include one or more memory agents 324 and a plurality of locations 328 configured to store data.

Optionally, the first computing device 304 may include a memory controller 332, at least one memory channel 334 (e.g., one, two (as illustrated), or more memory channels 334), and a first checkpoint controller 336, and the second computing device 308 may include a second checkpoint controller 340 and at least one second memory 344 in electrical communication with the second checkpoint controller 340. In yet another embodiment, the second computing device 308 is a replica of the first computing device 304, and therefore also includes a processor, a memory controller, and one inspection module positioned on a memory channel for each second memory 344.

The first and second checkpoint controllers 336, 340 may utilize, respectively, first and second buffers 348, 352. In one embodiment, as illustrated in FIG. 1, the first and second buffers 348, 352 are, respectively, sub-components of the first and second checkpoint controllers 336, 340. Alternatively, in another embodiment (not shown), the first and/or second buffer 348, 352 is an element on its respective computing device 304, 308 that is separate from the checkpoint controller 336, 340 of that device 304, 308, and with which the checkpoint controller 336, 340 communicates. The first and/or second buffers 348, 352 may each be implemented as a first-in-first-out (FIFO) buffer. In other words, the oldest information stored in the buffer 348, 352 is the first information to be removed from the buffer 348, 352. In one embodiment, the first checkpoint controller 336 uses the first buffer 348 to temporarily store information that is to be transmitted to the second checkpoint controller 340, but whose transmission is delayed due to bandwidth limitations.

As illustrated in FIG. 1, the processor 312 is in electrical communication, through the memory controller 332 and/or an inspection module 320, with both the first checkpoint controller 336 and the one or more first memories 316. The processor 312 can be any processor known in the art that is useful for directing a write request to a location 328 within a first memory 316 and for initiating a checkpoint. For example, the processor 312 may be one or more of the Xeon family of processors, manufactured by Intel Corporation of Santa Clara, Calif. In one embodiment, the write request directed by the processor 312 to a location 328 within a first memory 316 includes both a data payload and an address that identifies the location 328.

As illustrated in FIG. 1, the memory controller 332 may be in electrical communication with the processor 312, with the first checkpoint controller 336 via a connection 354, and, through the one or more inspection modules 320, with the first memories 316. In one embodiment, the memory controller 332 receives write requests from the processor 312, and selects the appropriate memory channel 334 over which to direct the write request. In another embodiment, the memory controller 332 receives read requests from the processor 312 and/or, as explained below, the first checkpoint controller 336, reads the data from the appropriate location 328 within the first memory 316, and returns such read data to the requestor. The memory controller 332 may be implemented in any form, way, or manner that is capable of achieving such functionality. For example, the memory controller 332 may be implemented as a hardware device, such as an ASIC or an FPGA.

For its part, a first memory 316 can be any memory that includes both i) a plurality of locations 328 that are configured to store data and ii) at least one memory agent 324, but typically a plurality of memory agents 324, that is/are configured to buffer a write request received from the processor 312 and to forward the data payload of the write request to a location 328. For example, a first memory 316 may be provided by using a single, or multiple connected, Fully Buffered Dual In-line Memory Module (FB-DIMM) circuit board(s), which is/are manufactured by Intel Corporation of Santa Clara, Calif. in association with the Joint Electronic Devices Engineering Council (JEDEC). Each FB-DIMM circuit board provides an Advanced Memory Buffer (AMB) and Synchronous Dynamic Random Access Memory (SDRAM), such as, for example, Double Data Rate (DDR)-2 SDRAM or DDR-3 SDRAM. More specifically, the AMB of an FB-DIMM circuit board may serve as a memory agent 324, and the SDRAM of an FB-DIMM circuit board may provide for the plurality of locations 328 within the first memory 316 at which data can be stored.

As illustrated in FIG. 1, a first memory 316 includes a plurality of sections 356. Each section 356 includes a memory agent 324 and a plurality of locations 328. In one such embodiment, the memory agent 324 of adjacent sections 356 are in electrical communication with one another. Accordingly, in one particular embodiment, an FB-DIMM circuit board may be used to implement each one of the plurality of sections 356, with the AMBs of each adjacent FB-DIMM circuit board in electrical communication with one another.

The second memory 344 may be implemented in a similar fashion to the first memory 316. It should be understood, however, that other implementations of the first and/or second memories 316, 344 are also possible.

Referring still to FIG. 1, each first memory 316 is electrically coupled to the processor 312 via a memory channel 334, which may be a high speed memory channel 334, and through the memory controller 332. An inspection module 320 is preferably positioned on each memory channel 334 and in series between the processor 312 and the first memory 316

(e.g., a memory agent 324 of the first memory 316) to which that memory channel 324 connects. Accordingly, in this embodiment, for a write request directed by the processor 312 to a first memory 316 to reach the first memory 316, the write request must first pass through an inspection module 320.

For its part, an inspection module 320 may be implemented as any hardware device that is capable of identifying a write request directed by the processor 312 to a location 328 within the first memory 316, and that is further capable, as described below, of examining, handling, and forwarding the write request or at least one portion thereof. For example, in one particular embodiment, the AMB manufactured by Intel Corporation of Santa Clara, Calif. is used by itself (i.e., separate and apart from an FB-DIMM circuit board and its associated SDRAM) to implement the inspection module 320. More specifically, in one such particular embodiment, the logic analyzer interface of the AMB may be used to capture write requests directed by the processor 312 to the first memory 316, and to forward the address and/or data information associated with such write requests to the first checkpoint controller 336.

For their part, the first and second checkpoint controllers 336, 340 may each be implemented in any form, way, or manner that is capable of achieving the functionality described below. For example, the checkpoint controllers 336, 340 may each be implemented as any hardware device, or as any software module with a hardware interface, that is capable of achieving, for example, the checkpoint buffering, control, and communication functions described below. In one particular embodiment, a customized PCI-Express card is used to implement one or both of the checkpoint controllers 336, 340.

In one embodiment, the first checkpoint controller 336 is in electrical communication with each inspection module 320, and with the memory controller 332. The first checkpoint controller 336 may also be in electrical communication with the second checkpoint controller 340 on the second computing device 308 via the communication link 310. In such a case, the second checkpoint controller 340 and the second memory 344 are remotely located from the one or more first memories 316.

The communication link 310 may be implemented as a network, for example a local-area network (LAN), such as a company Intranet, or a wide area network (WAN), such as the Internet or the World Wide Web. In one such embodiment, the first and second computing devices 304, 308 can be connected to the network through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above.

In an alternate embodiment (not shown), the computing system 300 does not include the second computing device 308. In such an embodiment, the first computing device 304 includes one or more second memories 344 (i.e., the one or more second memories 344 is/are local to the one or more first memories 316), and the first checkpoint controller 336 is in electrical communication with those one or more second memories 344.

Figure 2:
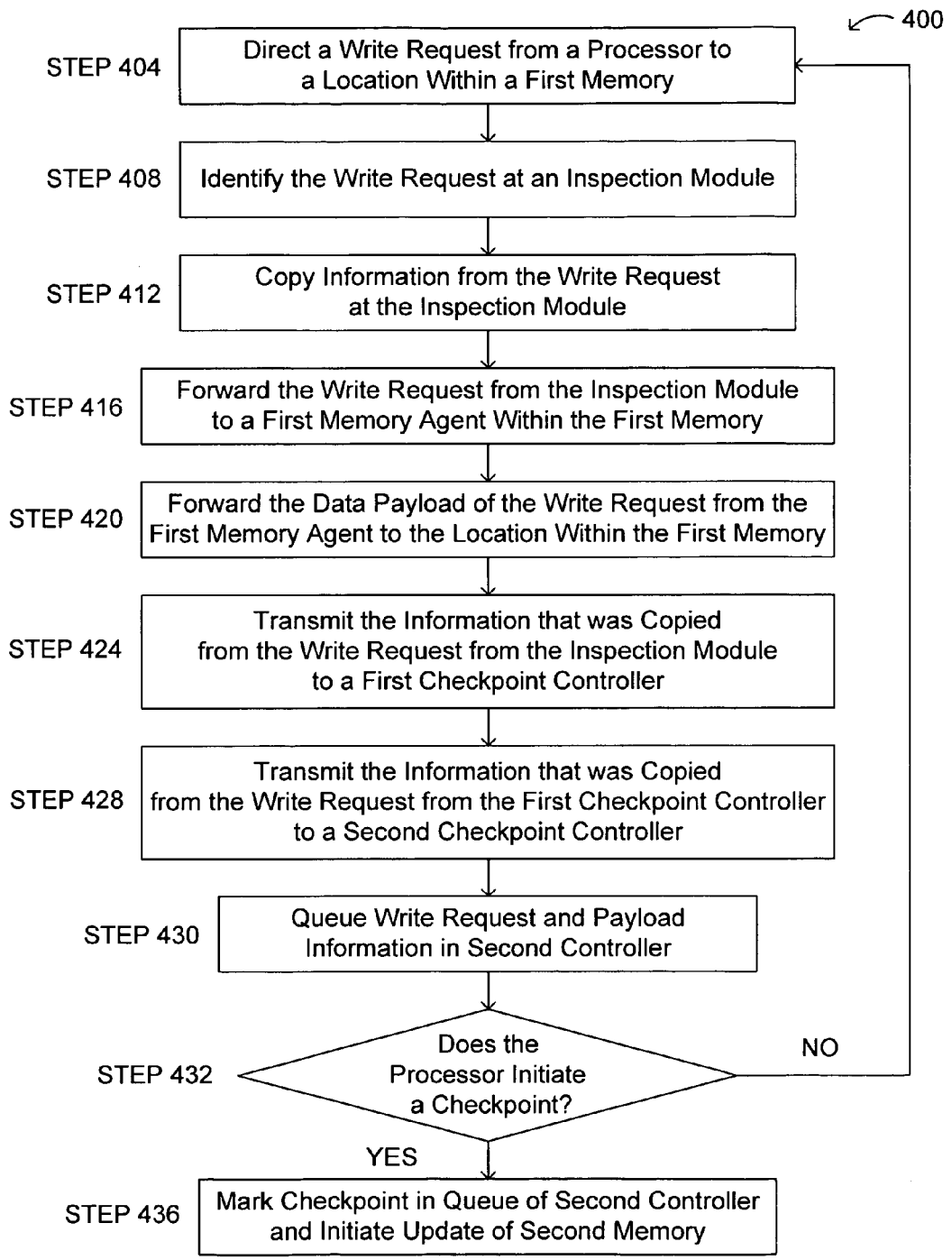
FIG. 2 is a flow diagram illustrating a method for checkpointing the memory.

FIG. 2 is a flow diagram illustrating a method 400 for checkpointing the first memory 316. Using the computing system 300 of FIG. 1, the processor 312 first directs, at step 404, a write request to a location 328 within a first memory 316. At step 408, the write request is identified at an inspection module 320. The inspection module 320 then copies, at step 412, information from the write request (e.g., the address that identifies the location 328 within the first memory 316 to which the write request is directed), and forwards, at step 416, the write request to a first memory agent 324 within the first memory 316. Upon receiving the write request, the first memory agent 324 may extract the data payload from the write request and forward, at step 420, that data payload to the location 328 within the first memory 316 for storage thereat.

Optionally, the inspection module 320 may transmit to the first checkpoint controller 336, at step 424, the information that was copied from the write request at step 412, the first checkpoint controller 336 may transmit that copied information to the second checkpoint controller 340 at step 428, the write request and payload information is queued at the second controller at step 430, and the processor 312 may initiate a checkpoint at step 432. If the processor 312 initiates a checkpoint at step 432, the checkpoint is marked in the queue of the second controller and the second memory 344 may be updated at step 436. Otherwise, if the processor 312 does not initiate a checkpoint at step 432, steps 404 through 428 may be repeated one or more times.

In greater detail, when the inspection module 312 identifies the write request at step 408, the inspection module 312 may buffer the write request thereat before forwarding, at step 416, the write request to the first memory agent 324. This buffering may facilitate, for instance, copying the information from the write request at step 412. Similarly, upon receiving the write request at step 416, the memory agent 324 may buffer the write request thereat before forwarding, at step 420, the data payload to the location 328 within the first memory 316. This buffering may facilitate the decoding and processing of the write request by the first memory agent 324. In forwarding, at step 420, the data payload to the location 328 within the first memory 316, the data payload and other information associated with the write request may first be forwarded from one memory agent 324 to another, until the data payload is present at the memory agent 324 in the section 356 at which the location 328 is present.

As mentioned, the inspection module 312 copies, at step 412, information from the write request. In one embodiment, the inspection module 312 copies only the address that identifies the location 328 within the first memory 316 to which the write request is directed. In another embodiment, in addition to copying this address, the inspection module 312 also copies the data payload of the write request. In yet another embodiment, the inspection module 312 copies the entire write request (i.e., the address, the data payload, and any other information associated with the write request, such as, for example, control information) at step 412.

After having copied the information from the write request at step 412, the inspection module 312 may transmit, at step 424, the copied information to the first checkpoint controller 336. Accordingly, the inspection module 312 may transmit the copy of the address, the copy of the address and the copy of the data payload, or the copy of the entire write request to the first checkpoint controller 336. The first checkpoint controller 336 may then store the copied information, which it receives from the inspection module 320, at the first buffer 348 utilized by the first checkpoint controller 336.

Where the inspection module 320 only copies, and only forwards to the first checkpoint controller 336, the address from the write request, the first checkpoint controller 336 may itself read data stored at the location 328 within the first memory 316 to obtain a copy of the data payload. The particular location 328 from which the first checkpoint controller 336 reads the data payload may be identified by the address that the first checkpoint controller 336 receives from the inspection module 320. In one such embodiment, the first checkpoint controller 336 reads the data by issuing a read request to the memory controller 332 via the connection 354, and by receiving a response from the memory controller 332 across the connection 354. Moreover, in such an embodiment, each inspection module 320 may be configured to ignore/pass on read requests directed by the memory controller 332 across the memory channel 334 on which the inspection module 320 is positioned. Each inspection module 340 may also be configured to ignore/pass on each response to a read request returned by a first memory 316 to the memory controller 332. Accordingly, in this implementation, because an inspection module 320 does not directly transmit data to the first checkpoint controller 336, the required bandwidth between the inspection module 320 and the first checkpoint controller 336 is reduced. Such an implementation could be used, for example, where performance demands are low and where system bandwidth is small.

In one embodiment of this implementation, the first checkpoint controller 336 reads the data from the location 328 within the first memory 316 immediately upon receiving the copy of the address from the inspection module 320. In other embodiments, the first checkpoint controller 336 buffers the received address in the first buffer 348 and reads the data from the location 328 when it is ready to, or is preparing to, transmit information at step 428, or when it is ready to, or is preparing to, update the second memory 344 at step 436. In some cases, upon reading the data, the first checkpoint controller 336 stores the data in the first buffer 348.

Where the computing system 300 includes the second computing device 308 (i.e., where the second memory 344 is remote from the first memory 316), the first checkpoint controller 336 may transmit to the second checkpoint controller 340, at step 428, the copy of the address and the copy of the data payload, or, alternatively, the copy of the entire write request. In one embodiment, the first checkpoint controller 336 transmits such information to the second checkpoint controller 340 in the order that it was initially stored in the first buffer 348 (i.e., first-in-first-out). Moreover, such information may be continuously transmitted by the first checkpoint controller 336 to the second checkpoint controller 340, at a speed determined by the bandwidth of the communication link 310. Upon receiving the copy of the address and the copy of the data payload, or, alternatively, the copy of the entire write request, the second checkpoint controller 340 may store such information in the second buffer 352. In one embodiment, the second checkpoint controller 340 continues to store such information in the second buffer 352, and does not write the copy of the data payload to the second memory 344, until a checkpoint marker is received, as discussed below, from the first checkpoint controller 336.

Alternatively, in another embodiment, where the computing system 300 does not include the second computing device 308 (i.e., where the second memory 344 is local to the first memory 316), step 428 is not performed. Rather, the first checkpoint controller 336 continues to store the copy of the address and the copy of the data payload, or, alternatively, the copy of the entire write request, in the first buffer 348 until the second memory 344 is to be updated at step 436.

At step 432, the processor 312 may initiate a checkpoint. If so, the second memory 344 is updated at step 436. Otherwise, if the processor 312 does not initiate a checkpoint at step 432, steps 404 through 428 may be repeated one or more times. In one embodiment, to initiate the checkpoint, the processor 312 transmits, to the first checkpoint controller 336, a command to insert a checkpoint marker into the first buffer 348. The first checkpoint controller 336 then inserts the checkpoint marker into the first buffer 348. Because, as described above, the first buffer 348 may be implemented as a FIFO buffer, placement of the checkpoint marker in the first buffer 348 can indicate that all data placed in the first buffer 348 prior to the insertion of the checkpoint marker is valid data that should be stored to the second memory 344. The first checkpoint controller 336 may transmit the checkpoint marker to the second checkpoint controller 340 in the first-in-first-out manner described above with respect to step 428. More specifically, the first checkpoint controller 336 may transmit the checkpoint marker to the second checkpoint controller 340 after transmitting any information stored in the first buffer 348 prior to the insertion of the checkpoint marker therein, but before transmitting any information stored in the first buffer 348 subsequent to the insertion of the checkpoint marker therein.

At step 436, the second memory 344 is updated. In one embodiment, upon receipt of the checkpoint marker at the second checkpoint controller 340, the second checkpoint controller 340 directs the second memory 344 to store, at the appropriate address, each copy of each data payload that was stored in the second buffer 352 prior to the receipt of the checkpoint marker at the second checkpoint controller 340. Alternatively, in another embodiment, where the computing system 300 does not include the second computing device 308 (i.e., where the second memory 344 is local to the first memory 316), the first checkpoint controller 336 directs the second memory 344 to store, at the appropriate address, each copy of each data payload that was stored in the first buffer 348 prior to the insertion of the checkpoint marker into the first buffer 348. In one such embodiment, the first checkpoint controller 336 transmits each such copy of the data payload to the second memory 344. Accordingly, in either embodiment, the state of the second memory 344 reflects the state of the first memory 316 as it existed just prior to the initiation of the checkpoint by the processor 312.

In such a fashion, the computing system 300 implements a method for continuously checkpointing memory operations. Thus, in the event that corrupt data is determined to be present in the first memory 316, processing may resume from the state of the second memory 344, which itself reflects the state of the first memory as it existed just prior to the initiation of the last checkpoint. In the embodiment where the second memory 344 is remotely located from the first memory 316 on the second computing device 308, such processing may resume on the second computing device 308.

In yet another embodiment, where corrupt data is determined to be present in the first memory 316, the first memory 316 may be recovered by re-synchronizing the first memory using similar methods described above with reference to synchronizing two systems. The computing system 300 enters a "synchronization mode" wherein data writes are captured and copied from the running (or "primary") system to the newly enables ("secondary") system, but instead of deferring the writes to a second memory, they take place as they are received. The primary system programmatically reads and writes back all memory locations, allowing the hardware capture and forward mechanisms to copy all the data to the secondary system. Once this process is completed, the first checkpoint marker can be generated, which when received by the secondary system causes it to transition into checkpoint mode at which point the subsequent received data is queued until the next checkpoint, in similar fashion to standard checkpointing operations.

Variations, modification, and other implementations of what is described herein will occur to those of ordinary skill in the art without departing from the spirit and scope of the invention as claimed. Accordingly, the invention is to be defined not by the preceding illustrative description but instead by the spirit and scope of the following claims.

What is claimed is:

1. A system for checkpointing memory, the system comprising:
   a processor configured to direct a write request to a location within a first memory, the write request comprising a data payload and an address identifying the location;
   the first memory comprising the location and a memory agent, the location configured to store the data payload and the memory agent configured to buffer the write request and to forward the data payload to the location; and
   an inspection module configured to identify the write request, to copy the address identifying the location, and to forward the write request to the memory agent, wherein the inspection module is positioned in series between the processor and the first memory.

2. The system of claim 1, wherein the inspection module is further configured to buffer the write request.

3. The system of claim 1 further comprising a first checkpoint controller in electrical communication with the inspection module.

4. The system of claim 3, wherein the inspection module is further configured to transmit the copy of the address to the first checkpoint controller.

5. The system of claim 4, wherein the first checkpoint controller utilizes a first buffer and is configured to store the copy of the address at the first buffer.

6. The system of claim 4, wherein the first checkpoint controller is configured to transmit the copy of the address to a second checkpoint controller in electrical communication with the first checkpoint controller.

7. The system of claim 3, wherein the first checkpoint controller utilizes a first buffer and is configured to store a copy of the data payload at the first buffer.

8. The system of claim 7, wherein the inspection module is further configured to copy the data payload.

9. The system of claim 8, wherein the inspection module is further configured to transmit the copy of the data payload to the first checkpoint controller.

10. The system of claim 7, wherein the first checkpoint controller is further configured to read data stored at the location within the first memory to obtain the copy of the data payload.

11. The system of claim 7, further comprising a second memory in electrical communication with the first checkpoint controller.

12. The system of claim 11, wherein the first checkpoint controller is further configured to transmit, when a checkpoint is initiated, the copy of the data payload to the second memory.

13. The system of claim 11, wherein the second memory is local to the first memory.

14. The system of claim 7, wherein the first checkpoint controller is further configured to transmit the copy of the data payload to a second checkpoint controller in electrical communication with the first checkpoint controller.

15. The system of claim 14, wherein the second checkpoint controller is remotely located from the first memory.

16. The system of claim 14, wherein the second checkpoint controller is in electrical communication with the first checkpoint controller over a network.

17. The system of claim 7, wherein the processor is further configured to initiate a checkpoint.

18. The system of claim 17, wherein the first checkpoint controller is further in electrical communication with the processor, and wherein the processor is further configured to transmit, to the first checkpoint controller, a command to insert a checkpoint marker into the first buffer.

19. The system of claim 18, wherein the first checkpoint controller is further configured to insert the checkpoint marker into the first buffer.

20. The system of claim 18, wherein the first checkpoint controller is further configured to transmit the checkpoint marker to a second checkpoint controller in electrical communication with the first checkpoint controller.

21. A method for checkpointing memory, the method comprising:
   directing a write request from a processor to a location within a first memory, the write request comprising a data payload and an address identifying the location;
   identifying the write request at an inspection module, wherein the inspection module is positioned in series between the processor and the first memory agent;
   copying the address identifying the location at the inspection module;
   forwarding the write request from the inspection module to a first memory agent within the first memory; and
   forwarding the data payload from the first memory agent to the location within the first memory.

22. The method of claim 21 further comprising buffering the write request at the inspection module before forwarding the write request from the inspection module to the first memory agent.

23. The method of claim 21 further comprising buffering the write request at the first memory agent before forwarding the data payload from the first memory agent to the location within the first memory.

24. The method of claim 21 further comprising transmitting the copy of the address from the inspection module to a first checkpoint controller.

25. The method of claim 24 further comprising buffering the copy of the address at a first buffer utilized by the first checkpoint controller.

26. The method of claim 24 further comprising transmitting the copy of the address from the first checkpoint controller to a second checkpoint controller.

27. The method of claim 21 further comprising buffering a copy of the data payload at a first buffer utilized by a first checkpoint controller.

28. The method of claim 27 further comprising copying the data payload at the inspection module.

29. The method of claim 28 further comprising transmitting the copy of the data payload from the inspection module to the first checkpoint controller.

30. The method of claim 27 further comprising reading data stored at the location within the first memory to obtain for the first checkpoint controller the copy of the data payload.

31. The method of claim 27 further comprising transmitting, upon initiation of a checkpoint, the copy of the data payload from the first checkpoint controller to a second memory.

32. The method of claim 31, wherein the second memory is local to the first memory.

33. The method of claim 27 further comprising transmitting the copy of the data payload from the first checkpoint controller to a second checkpoint controller.

34. The method of claim 33, wherein the second checkpoint controller is remotely located from the first memory.

35. The method of claim 27 further comprising initiating a checkpoint at the processor.

36. The method of claim 35, wherein initiating the checkpoint comprises transmitting, from the processor to the first checkpoint controller, a command to insert a checkpoint marker into the first buffer.

37. The method of claim 36 further comprising inserting the checkpoint marker into the first buffer.

38. The method of claim 36 further comprising transmitting the checkpoint marker from the first checkpoint controller to a second checkpoint controller.

* * * * *